United States Patent [19]

Kurata et al.

[11] 4,067,243
[45] Jan. 10, 1978

[54] ENGINE STARTING DEVICE FOR A MOTORCYCLE

[75] Inventors: Noboru Kurata, Kamifukuoka; Goroei Wakatsuki, Ohimachi; Mikihiro Koyama, Kawagoe, all of Japan

[73] Assignee: Honda Giken Kogyo Kabushiki Kaisha, Tokyo, Japan

[21] Appl. No.: 715,903

[22] Filed: Aug. 19, 1976

[30] Foreign Application Priority Data

Aug. 25, 1975 Japan .................................. 50-102734

[51] Int. Cl.$^2$ ........................... F02N 3/04; F02N 5/02
[52] U.S. Cl. ...................................... 74/6; 123/179 S; 123/179 SE; 180/33 R; 180/82 R; 185/39; 185/41 A; 185/43; 192/1
[58] Field of Search ............... 74/6; 185/39, 41 A, 185/43; 123/179 S, 179 SE; 192/1; 180/82 R, 33 R

[56] References Cited

U.S. PATENT DOCUMENTS

| 1,009,503 | 11/1911 | Goodhart | 185/43 |
|---|---|---|---|
| 1,936,554 | 11/1933 | Lansing | 185/41 |
| 2,152,969 | 4/1939 | Nash | 185/43 |
| 2,638,175 | 5/1953 | Poulsen | 180/33 R |
| 2,997,995 | 8/1961 | Vakos | 123/179 S |
| 4,003,190 | 1/1977 | Braun et al. | 123/179 SE |

FOREIGN PATENT DOCUMENTS

| 1,204,020 | 3/1963 | Germany. |
|---|---|---|
| 1,905,839 | 2/1969 | Germany. |

*Primary Examiner*—Allan D. Herrmann
*Attorney, Agent, or Firm*—Haseltine, Lake & Waters

[57] ABSTRACT

An improved engine starting device for a motorcycle of the kick pedal type is provided which is easy to operate, does not require any large force of operation and is thus particularly suitable for an unskilled and powerless person such as a woman or girl to operate. To this end, the device includes a spiral spring which is operatively associated with an engine crankshaft and with a pedal arm so that it can rotate the crankshaft for engine cranking by releasing its spring force or energy previously accumulated by several repetitive swing motions of the pedal arm due to the rider's foot operation. The device also provides improved safety in engine starting operation by preventing the motorcycle from starting to run unintendedly even where the engine is started with the engine throttle valve being opened excessively. For this purpose, release means, which is operable to cause the spiral spring to release its accumulated force or energy for engine cranking, is operatively connected with a manipulative member of a control system such as, for example, a brake mechanism or a clutch means, which acts to render the motorcycle inoperative, in a manner such that the former is caused to operate in response to actuation of the latter.

6 Claims, 3 Drawing Figures

ENGINE STARTING DEVICE FOR A MOTORCYCLE

BACKGROUND OF THE INVENTION

This invention relates to an engine starting device for a motorcycle of the relatively light weight class, which is particularly suitable for, and easily operated by, an unskilled person such as a woman or girl.

In conventional motorcycles, there are widely used two types of engine starting devices; one employing a switch operated electric motor and the other employing a kick pedal adapted to be operated by large foot force of the rider. The former is easy to operate but cannot be constructed at low cost because the electric motor employed therein is costly, while the latter can be manufactured at relatively low cost but requires large operation force and skill, and hence cannot be operated readily by an unskilled person such as a woman or girl.

SUMMARY OF THE INVENTION

Accordingly, one object of the present invention is to provide a novel and improved engine starting device for a motorcycle which is easy to operate and low in cost of fabrication, thus obviating the abovementioned disadvantages of the prior art devices. To attain this, it is proposed according to the present invention that an engine crankshaft is rotated for engine cranking by instantaneous release of the spring force which has previously been accumulated in a spiral spring by a plurality of repetitive swing motions of a pedal arm operatively associated therewith.

Another object of the present invention is to provide an improved engine starting device for a motorcycle which is capable of improving safety in engine starting operation by preventing the motorcycle from starting to run unintentionally even where the engine is started with the engine throttle valve being opened excessively.

The above and other objects, features and advantages of the present invention will be more fully understood from the following detailed description of the invention, when taken in conjunction with the accompanying drawings, which illustrate a presently preferred embodiment of the invention.

DESCRIPTION OF THE PREFERRED EMBODIMENT

Figure 1:
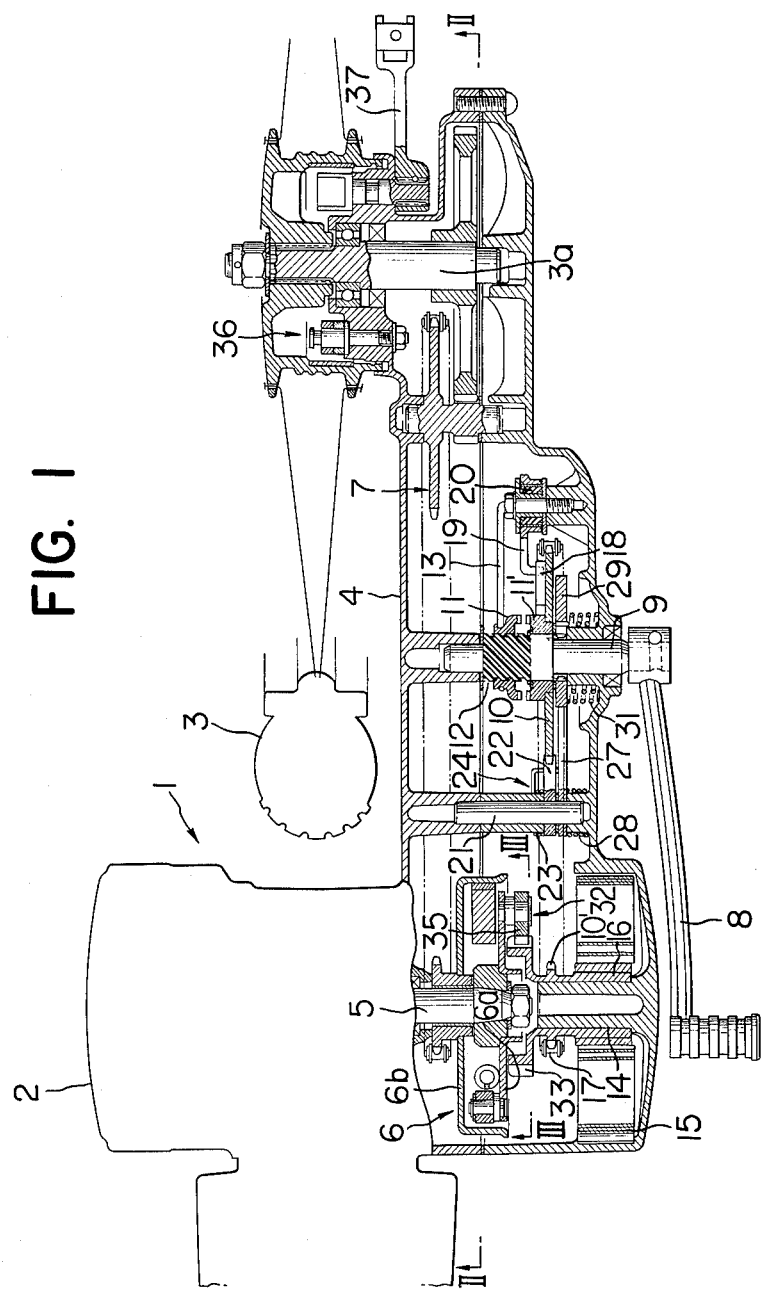
FIG. 1 is a plan view, in longitudinal cross section, of a motorcycle power unit incorporating therein an engine starting device constructed according to the principles of the present invention.

Referring to the drawings, reference numeral 1 generally indicates a power unit adapted to be installed on the body of a motorcycle (not shown), which comprises an engine 2, a rear wheel 3 and a transmission casing 4 interconnecting the engine and the rear wheel. Within the transmission casing 4 there are accommodated a well-known type of centrifugal clutch, generally designated at 6, which has an input member 6a fixedly mounted on one end of an engine crankshaft 5, a transmission mechanism, generally designated at 7, which functions to transmit a drive force from an output member 6b of the centrifugal clutch 6 to a rotation axle 3a of the rear wheel 3, and an engine starting device, which will be described later in detail.

In the right- and left-hand side walls of the transmission casing 4, there is journalled a pedal shaft 9 which is reciprocatively rotated by means of a pedal arm 8 connected thereto and which has at one side a drive sprocket 10 rotatably mounted thereon and at the other side a first clutch half 11 threadedly fitted thereon and adapted to be engageable with a second clutch half 11' formed on the boss of the drive sprocket 10. At that portion of the pedal shaft 9 on which is to be threadedly fitted the first clutch half 11, there are formed quick or rough threads 12 so that by means of reciprocating rotation of the pedal shaft 9, the first clutch half 11 is moved fast in the forward or rearward direction relative to the other, second clutch half 11' so as to be placed into or out of locking engagement therewith. A rod-like friction spring 13 is provided to prevent rotation of the first clutch half 11, thereby ensuring the forward or rearward movement thereof relative to the second clutch half 11' during reciprocating rotation of the pedal shaft 9. The friction spring 13 is fixed at one end to the transmission casing 4 and is pressure engaged at the other end with the outer periphery of the first clutch half 11.

Integrally formed with the transmission casing 4 in axial alignment with the crankshaft 5 is a support shaft 14 over which is fitted a tubular shaft or sleeve 16 for free rotation relative thereto. A spiral spring 15 is firmly secured at the inner end to the tubular shaft 16 and at the outer end to the transmission casing 4 with an appropriate amount of tension being afforded in an expanding sense so that it can accumulate spring force when wound up onto the tubular shaft 16.

The tubular shaft 16 is formed on its outer periphery with an integral driven sprocket 10', which has a diameter smaller than that of the drive sprocket 10 and is operatively connected therewith by means of an endless chain 17.

The drive sprocket 10 is provided on one side face with a radial projection 18 raised therefrom, the projection adapted to be engageable with a stopper element 19, secured to the transmission casing 4 through elastic support members 20, so as to define the angular range of rotation of the drive sprocket 10 and hence the number of rotation of the tubular shaft 16. With such arrangement, the pretension afforded to the spiral spring 15 is retained by engagement of the underside of the projection 18 with the stopper element 19.

A locking pawl 22 is pivotally mounted at the basal end on a pivot shaft 21 supported in the transmission casing 4 in parallel relation with the pedal shaft 9 and is urged at the distal end under the twisting torque of a coiled spring 23 into locking engagement with one of the teeth formed on the outer periphery of the drive sprocket 10. Thus, the locking pawl 22 acts to permit only forward rotation of the drive sprocket 10 due to depression or downward swing of the pedal arm 8 but prevent reverse rotation and it may be operatively associated with a manipulative member of a control system such as a brake mechanism or a clutch means in such a manner as to be disengaged from the drive sprocket 10 only when the manipulative member is actuated.

Also, pivotally mounted on the pivot shaft 21 is a bellcrank lever 27 which is operatively connected through a connection lever 26 with a brake operating wire 25 arranged outside of the transmission casing 4 and is held in abutting engagement with the connection lever 26 under the twisting torque given to the bellcrank lever 27 by a coiled spring 28. The bellcrank lever 27 is formed at the underside edge with an abutment piece 27a extending downwardly as to release, when rotated downwardly or in a clockwise direction in FIG. 2, the locking pawl 22 from engagement with the associated tooth of the drive sprocket 10. A cam plate 29 is splined over the pedal shaft 9 so as to restrict pivotal movement of the bellcrank lever 27 within a certain angular range, and comprises a generally semicircular portion 29a, serving to restrict the aforesaid pivotal movement of the bellcrank lever 27 only when the pedal arm 8 is depressed, and a radial abutment face 29b formed on one side of the semicircular portion 29a and adapted to be engageable with the abutment projection 30 formed on the inside wall of the transmission casing 4 to define the rearwardly receded positon, or upper limit position of the pedal arm 8. A return spring 31 is disposed under tension between the cam plate 29 and the interior wall of the transmission casing 4 to normally urge the pedal arm 8 into the upper limit position.

The locking pawl 22, bellcrank lever 27, connection lever 26 and brake operating wire 25 constitute a release means 24 which acts to normally lock the spiral spring or force accumulating means 15 for retention of the accumulated spring force or energy and is operated to optionally unlock it for release thereof.

Arranged between the tubular shaft 16 and the input member 6a of the centrifugal clutch 6 is a one-way clutch 32 adapted to only transmit rotation of the tubular shaft 16 caused by the accumulated spring force of the spiral spring 15 to the input member 6a and hence to the crankshaft 5 but not vice versa. As clearly shown in FIG. 3, the one-way clutch 32 is comprised of a ratchet wheel 33 integrally formed with the tubular shaft 16 at one end face thereof, and a plurality of pawl members 35 each pivoted to the input member 6a and normally urged under resiliency of a spring member 24 into meshing engagement with the toothed outer periphery of the ratchet wheel 33.

As is usual in the art, the brake operating wire 25 is connected between the brake lever (not shown) mounted on a steering handle and an operation lever 37 of a well-known brake mechanism 36 accommodated within the hub of the rear road wheel 3, the brake mechanism being operable under the pull of the wire 25 caused by operation of the brake lever.

In operation of the embodiment described hereinbefore, for starting the engine 2, the pedal arm 8 is reciprocatively swung or rotated in a forward and reverse direction several times repetitively by foot operation of the rider in combination with the restoring action of the return spring 31. As the pedal shaft 9 is swung or rotated in a forward direction, i.e., in a counterclockwise direction in FIG. 2, due to the rider's foot operation, the first clutch half 11 is initially moved forward axially of the pedal shaft 9 under the fast forwarding action of the quick thread 12 into locking engagement with the other, second clutch half 11' so that further forward rotation of the pedal shaft 9 is transmitted through the drive sprocket 10 and the endless chain 17 to driven sprocket 10' to drive the tubular shaft 16 to rotate, whereby the spiral spring 15 is wound up onto the tubular shaft 16 for accumulation of the spring force. During forward rotation of the pedal shaft 9, the ratchet wheel 33 of the one-way clutch 32 is rotated in a counterclockwise direction in FIG. 3 while pushing outward the pawl members 35 with the crankshaft 5 being held stationary. On the other hand, reverse rotation of the pedal shaft 9 due to the restoring force of the return spring 31 causes the first clutch half 11 to quickly recede or move rearwardly to be disengaged from the other, second clutch half 11' in a short time after commencement of such pedal shaft rotation so that further reverse rotation of the pedal shaft 9 is not transmitted to the drive sprocket 10. On this occasion, it is to be noted that during such reverse rotation of the pedal shaft 9, the locking pawl 22 is urged under the action of the spring 23 into locking engagement with the associated one of the teeth of the drive sprocket 10 to restrain reverse rotation of the drive sprocket 10 due to the accumulated force of the spiral spring 15. In this manner, force accumulation of the spiral spring 15 is completed at the time when the drive sprocket 10 is rotated substantially through a revolution until the projection 18 formed at one side face of the drive sprocket 10 is put into abutting engagement with the stopper element 19.

Subsequently thereafter, as the brake operating wire 25 is pulled in the leftward direction in FIG. 2 by operation of the brake lever (not shown) operatively connected thereto, the connection lever 26 is rotated to cause the bellcrank lever 27 to rotate about the pivot shaft 21 in a clockwise direction, thereby forcing, through the abutment piece 27a, the locking pawl 22 to pivot to a released position relative to the drive sprocket 10 so that the accumulated spring force of the spiral spring 15 can be released at a time and transmitted as a large torque from the tubular shaft 16 through the one-way clutch 32 to the crank-shaft 5 to cause it to rotate in a clockwise direction in FIGS. 2 and 3, whereby the engine 2 is started to operate.

In this connection, it should be noted that when the rotation speed of the crankshaft 2 is increased under engine operation to exceed that of the tubular shaft 16 due to the accumulated force of the spiral spring 15, a pawl members 35 begin to slide along the toothed outer periphery of the ratchet wheel 33 and thus become disengaged therefrom, and by the time when the engine crankshaft 5 reaches the usual idling speed, the pawl members 35 are forced under centrifugal effect to swing outwardly against the set load of the spring 34 so that the one-way clutch 32 become completely separated from the ratchet wheel 33. As a consequence, during normal travel of the motorcycle, the crankshaft 5 and the engine starting device of the invention are held completely released from the operative connection therebetween.

Even in cases where the rotation speed of the crankshaft 5 rises abruptly during engine starting operation to place the centrifugal clutch 6 into the operative condition so that the output torque of the crankshaft 5 is transmitted to the rear wheel 3, the motorcycle is positively prevented from starting to run unintendedly because at this time the brake mechanism 36 is retained in the operative condition by means of the brake operating wire 25 which is still pulled. Accordingly, to start the motorcycle, it is necessary for the rider to deactuate the brake mechanism 36.

Figure 2:
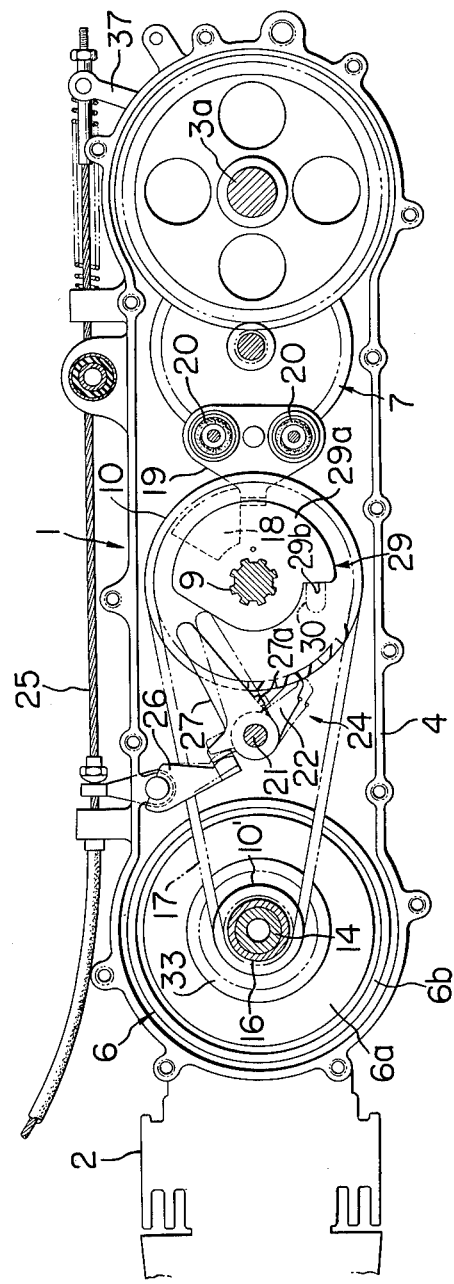
FIG. 2 is a cross section taken along the line II—II in FIG. 1.
Figure 3:
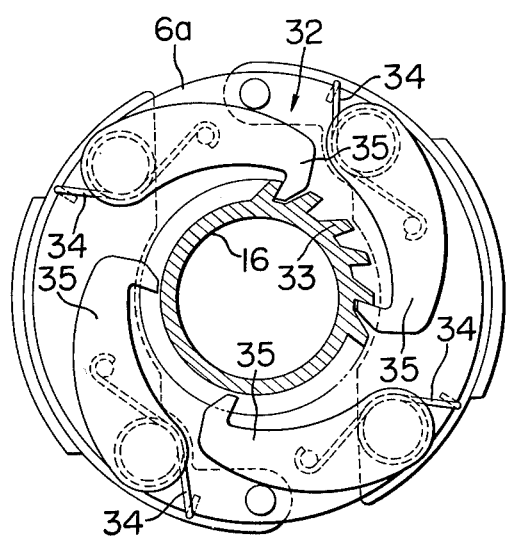
FIG. 3 is a cross section, on an enlarged scale, taken along the line III—III in FIG. 1.

As the spiral spring 15 releases its accumulated spring force, the drive sprocket 10 is rotated in a clockwise direction in FIG. 2 by the driven sprocket 10' through the endless chain 17 until the underside of the projection 18 formed integrally with the drive sprocket 10 comes into abutting engagement with the stopper element 19, and upon such engagement taking place, release of the accumulated force of the spiral spring 15 is ceased to preserve the remaining force as a pretension. On this occasion, the stopper element 19 is subjected to impactive forces created by a part of the accumulated energy of the spiral spring 15 and the innertial force of the drive sprocket 10 and its associated components, but such impactive forces are substantially absorbed by the elastic deformation of the elastic support elements 20, through which the stopper element 19 is resiliently secured to the transmission casing 4.

Turing to the description of the force accumulating operation of the spiral spring 15, when the pedal arm 8 is depressed or swung downwardly, the cam plate 29 is rotated along with the pedal shaft 9 so that the semicircular portion 29a thereof is angularly displaced into abutting engagement with the free end of the bellcrank lever 27. In this state, even where the brake operating wire 25 is pulled, the bellcrank lever 27 is held against pivotal movement in the clockwise direction by means of the cam plate 29 with the result that the locking pawl 22 is retained in locking engagement with the drive sprocket 10. In other words, during depressing operation of the pedal arm 8, there will be no release of the accumulated energy from the spiral spring 15, whereby any dangerous thrown-up of the pedal arm 8 possibly resulting from inadvertent release of such accumulated energy is securely prevented.

From the foregoing description, it will be appreciated that according to the present invention, as engine cranking is effected by instantaneous release of the spring force or energy of the spiral or force accumulating means 15 accumulated by several depressions of the pedal arm 8 due to riders' foot operation, the engine 2 is started very easily and surely without requiring any large operation force of the rider and hence even a woman or girl, who is unskilled and has relatively weak muscular force, is able to quite readily operate a motorcycle equipped with the present engine starting device. Further, the simplified construction of the device as well as no adoption of any costly electric motor for engine starting makes it possible to provide the engine starting device at low cost.

According to another aspect of the invention, the spiral spring 15, winding means such as the tubular shaft 16 serving to wind up thereon the spiral spring 15 for accumulation of spring force, and the one-way clutch 32 acting to transmit the accumulated force or torque of the spiral spring 15 from the winding means to the engine crankshaft 5 are all arranged in axial alignment with each other. Due to such arrangement, efficiency in torque transmission from the spiral spring 15 to the crankshaft 5 is very high and hence the accumulated energy of the spiral spring 15 can be utilized most effectively as power for starting the engine 2. In addition, the entire device can be made in a compact size.

According to a further aspect of the invention, since the spiral spring 15 is so designed as to release its accumulated energy only in the operative condition of the brake mechanism 36, the brake mechanism 36 is necessarily held operated during engine starting operation thereby to positively prevent the motorcycle from being started to run inadvertently for safety operation.

According to a still further aspect of the invention, the number of rotation of the winding means due to the accumulated force of the spiral spring 15 is limited by the stopper element 19, which is mounted on the transmission casing 4 through the intermediary of the elastic support members 20, so that upon release of the accumulated spring force, excessive unwinding of the spiral spring 15 is effectively suppressed without accompanying any impact, thereby avoiding breakage or detachment of the spiral spring 15 at the end portions thereof.

According to a further aspect of the present invention, the release means 24, which is operable to cause the spiral spring 15 to release its accumulated energy for engine cranking at a desired point of time, and the manipulative member of the control system, which functions to render the motorcycle inoperative, are operatively interconnected with each other in such a manner that the former is caused to operate in response to actuation of the latter. With such arrangement, at the time of starting of the engine, the motorcycle is necessarily held inoperative and thus prevented from starting to run unintendedly even where the engine throttle valve is opened to an excessive degree by erroneous operation of the rider, thereby avoiding any dangerous situation resulting therefrom for safety operation.

While one preferred embodiment of the invention has been disclosed herein, it will be apparent to those skilled in the art that various modifications thereof may be made without departing from the spirit or scope of the invention as defined in the appended claims.

What is claimed is:

1. An engine starting device for a motorcycle comprising: a transmission casing arranged adjacent an engine installed on the motorcycle body, a pedal arm pivotally connected to said transmission casing and operatively connected to an engine crankshaft, a force accumulating means secured at one end to said transmission casing and at the other end to a winding means; said winding means being adapted to wind-up said force accumulating means and being operatively connected with said pedal arm through release means; a control system actuatable for rendering the motorcycle inoperative and being operatively connected to said release means for causing the latter to unlock said force accumulating means in response to the actuation thereof; and one-way clutch means interposed between said winding means and said crankshaft for transmitting a rotational force only in the direction from the former to the latter, whereby in an operative condition of said release means, said winding means by oscillatory motion of said pedal arm, rotates to effect accumulation of a spring force of said force accumulating means while said release means is in an inoperative condition, said crankshaft being rotatable for engine cranking during release of the accumulated force by said force accumulating means.

2. An engine starting device as claimed in claim 1, wherein: said force accumulating means, said winding means and said one-way clutch means are all arranged in axially aligned relation with respect to each other.

3. An engine starting device as claimed in claim 1, comprising: a stopper element mounted on said transmission casing through intermediary of elastic supports to thereby limit rotaton of said winding means due to the accumulated force to said force accumulating means.

4. An engine starting device as claimed in claim 1, wherein: said one-way clutch means comprises a ratchet wheel provided on said tubular shaft and a plurality of pawl members pivotably connected to said engine crank shaft, said pawl members being normally spring-biased into meshing engagement with said ratchet wheel and disengaged therefrom under a centrifugal effect when the engine crankshaft exceeds a predetermined speed of rotation.

5. An engine starting device as claimed in claim 1, wherein: said force accumulating means comprises a spiral spring.

6. An engine starting device as claimed in claim 10, wherein: said force accumulating means comprises a tubular shaft rotatably supported on said transmission casing, and said spiral spring being connected at one end with said tubular shaft and at the other end with said transmission casing.

* * * * *